J. F. Parkes,
Sawing Shingles,
N° 40,274. Patented Oct. 13, 1863.
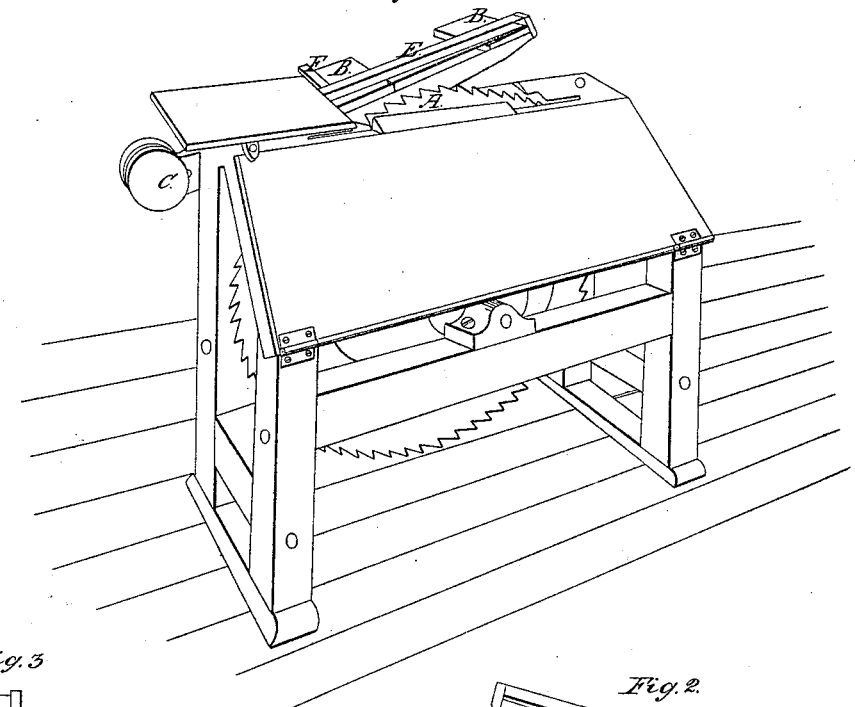
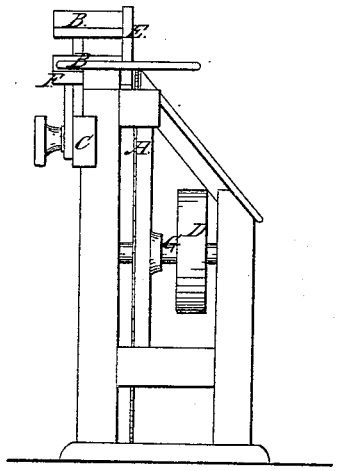
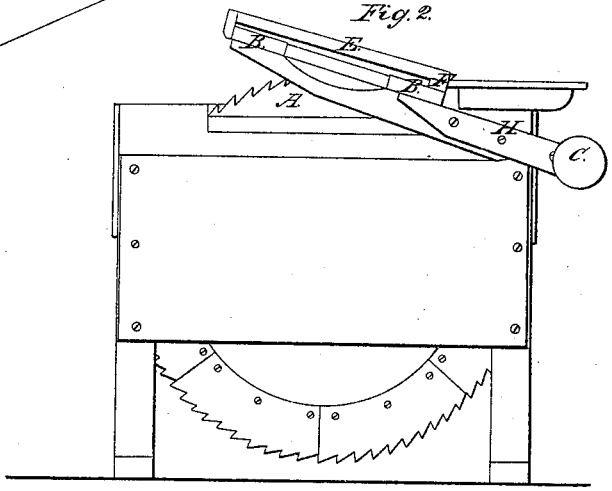
Witnesses.
A. Manless
Joseph Parkes
Inventor.
John Freadrich Parkes

UNITED STATES PATENT OFFICE.

JOHN FREDERICK PARKES, OF DETROIT, MICHIGAN.

IMPROVEMENT IN MACHINES FOR JOINTING SHINGLES.

Specification forming part of Letters Patent No. 40,274, dated October 13, 1863.

*To all whom it may concern:*

Be it known that I, JOHN FREDERICK PARKES, of Birmingham, England, and now residing in the city of Detroit, in the county of Wayne, State of Michigan, have invented a new and useful Machine for Jointing Shingles and Barrel-Headings; and I do hereby declare that the following is a full, clear, and exact description of the construction and operation of the same, reference being had to the annexed drawings, making a part of this specification, in which—

Figure 1 is a perspective view. Fig. 2 is a front elevation. Fig. 3 is an end view of the machine, in which—

The part marked A″ is a circular saw. B″ B″ is a hinged table. C″ is a weight. D″ is a pulley. E″ is a guard piece. F is a stop-piece. G″ is a shaft; H, a pin or bolt.

To enable others skilled in the art to make and use my invention, I will proceed to describe its construction and operation.

I construct a frame for the machine in the usual manner. I provide a shaft, G″, on which is fixed the saw A″ and the pulley D″. I provide a table, B″ B″, which works on the upper part of the frame of the machine on the pin or bolt H″. On the said table B″ B″ is a guard and gage piece, E″, and also the stop-piece F″ and the weight C″.

The operation of the machine is as follows: A belt runs on the pulley D″ from the power used, causing the shaft G″ to revolve, and with it the saw A″. I put a shingle on the table B″ B″, with the butt of the shingle to the stop-piece F″, and pushing the edge of the shingle under the guard or gage piece E″, until I can see a good edge of the shingle outside of the guard-piece E, then press down the table B″ B″, bringing the shingle down on the saw, thereby cutting off the rough edge of the shingle and making it square with the butt. The shingle is turned over, and the same time the weight C″ raises the table B″ B″ again. The operation is repeated, and the shingle is finished.

I claim—

1. The combination of the hinged or falling table B″ B″ with the circular saw A″, as described.

2. Bringing the middle of the shingle or barrel-heading, or nearly so, first to the saw.

3. The use of the guard or gage piece E″.

4. The whole machine, constructed substantially as and for the purposes set forth.

JOHN FREDERICK PARKES.

Witnesses:
A. WANLESS,
JOSEPH PARKES.